(12) United States Patent
Kirchknopf et al.

(10) Patent No.: US 11,590,551 B2
(45) Date of Patent: Feb. 28, 2023

(54) EXPANDING METAL WITH LOOPS IN DIFFERENT SHAPES

(71) Applicant: GRAMMER Interior Components GmbH, Hardheim (DE)

(72) Inventors: Heiko Kirchknopf, Hardheim (DE); Christian Schreck, Koenigheim (DE); Ralf Tuerk, Wallduern (DE); Gunter Link, Buchen-Hainstadt (DE)

(73) Assignee: GRAMMER Interior Components GmbH, Hardheim (DE)

( * ) Notice: Subject to any disclaimer, the term of this patent is extended or adjusted under 35 U.S.C. 154(b) by 163 days.

(21) Appl. No.: 17/101,332

(22) Filed: Nov. 23, 2020

(65) Prior Publication Data

US 2021/0129202 A1 May 6, 2021

Related U.S. Application Data

(62) Division of application No. 16/163,202, filed on Oct. 17, 2018, now abandoned.

(30) Foreign Application Priority Data

Nov. 9, 2017 (DE) .......................... 102017126315.2

(51) Int. Cl.
*B21D 31/04* (2006.01)
*B60H 1/34* (2006.01)

(52) U.S. Cl.
CPC ......... *B21D 31/043* (2013.01); *B60H 1/3407* (2013.01); *Y10T 29/18* (2015.01)

(58) Field of Classification Search
CPC ...... B21D 31/043; Y10T 29/18; B60H 1/3407
See application file for complete search history.

(56) References Cited

U.S. PATENT DOCUMENTS 3,570,086 A * 3/1971 Stone ................... B21D 31/043
83/695
4,315,356 A * 2/1982 Laurie .................. B21D 31/046
29/6.1

FOREIGN PATENT DOCUMENTS

CN 103117395 A 5/2013
CN 107407999 A 11/2017
(Continued)

OTHER PUBLICATIONS

"Raised Expanded Metal with Various Materials & Designs" Catalog, Boegger, May 10, 2016, https://www.steelexpandedmetal.com/steelexpandedmetal/raised-expanded-metal.html (Boegger) (Year: 2016).*

(Continued)

*Primary Examiner* — Humera N. Sheikh
*Assistant Examiner* — Kevin C T Li
(74) *Attorney, Agent, or Firm* — Von Rohrscheidt Patents (57) ABSTRACT

A method for producing an expanded metal, the method including producing a sheet of the expanded sheet metal by introducing openings through one expansion blade wherein all the openings are configured as diamond shaped loops without a material loss and defined by a loop width, a loop length and a loop shape; and forming the diamond shaped loops respectively by four linear bars that are defined by a bar width and a bar thickness wherein two of the four linear bars are respectively connected at four nodes; arranging plural of the diamond shaped loops in columns adjacent to one another and in rows adjacent to one another; and forming first columns of first diamond shaped loops different from second columns of diamond shaped second loops in a loop width or in a loop length respectively measured from a node center to a node center.

14 Claims, 10 Drawing Sheets

(56) References Cited

FOREIGN PATENT DOCUMENTS

| CN | 110023587 | A  |   | 7/2019  |            |
|----|-----------|----|---|---------|------------|
| DE | 19913028  | C1 | * | 8/2000  | B21D 31/043 |
| DE | 19913028  | C1 |   | 8/2000  |            |
| DE | 10357732  | A1 |   | 11/2000 |            |
| DE | 10027010  | A1 |   | 12/2001 |            |
| TW | 200414581 | A  |   | 8/2004  |            |

OTHER PUBLICATIONS

"Expanded Metal Diamond Mesh for Filter, Fencing Guards/ Enclosures and Decorative Mesh", Anping Puruise Expanded Metal Factory Products Catalog, Dec. 5, 2016, https://www.expanded-metal.org/expanded-metal/expanded-steel-diamond-mesh.htm (Anping) (Year: 2016).*

* cited by examiner

EXPANDING METAL WITH LOOPS IN DIFFERENT SHAPES

RELATED APPLICATIONS

This application is a divisional of U.S. patent application Ser. No. 16/163,202 filed on Oct. 17, 2018 that claims priority from German patent application DE 10 2017 126 315.2 filed on Nov. 9, 2017, both of which are incorporated in their entirety by this reference.

FIELD OF THE INVENTION

The invention relates to an expanded metal.

Expanded metal is well known in the art. This is sheet metal sheets that has a plurality of openings. The openings are introduced into the sheet metal by a so called expansion blade so that no material is lost from the sheet metal. The sheet metal is pulled along under an expansion blade that moves up and down in a vertical direction relative to a sheet metal plane and also moves sideways in an alternating manner. The expansion blade has a tooth contour. The teeth of the expansion blade penetrate into the sheet metal plane and displace the metal. This changes dimensions of a defined sheet metal section in particular with respect to its length and also slightly with respect to its width.

BACKGROUND OF THE INVENTION

Dimensional changes of the expanded sheet metal relative to its non-expanded base material can lead to strong deformations of the expanded sheet metal if the dimensional changes are not introduced uniformly. This impairs further processing of the expanded metal if tight tolerances are exceeded. If certain tolerances are exceeded finishing is required. If additional tolerances are exceeded scrap may be produced depending on the application of the expanded metal. Possible uneven dimensional changes are caused in particular by different degrees of wear of teeth of the expansion blade. Expanded metal is used in many applications. It is used for covering facades of buildings and for fence construction, for visual shielding purposes and it is also used in the fabrication of automobiles.

Requirements regarding the quality of the expanded metal are particularly high in the fabrication of automobiles since the expanded metal is typically used as an interior covering material in the vehicles. Expanded metal is used for example for covering speakers. However, in some applications it is also used in large areas in order to cover ventilation openings of defroster nozzles for the wind screens or other car windows.

BRIEF SUMMARY OF THE INVENTION

Thus, it is an object of the invention to expand the application of expanded metals in particular in automotive fabrication and to provide an expanded metal with novel properties.

The object is achieved by expanded metal including a sheet of expanded sheet metal that includes openings configured as loops that are introduced essentially without a material loss and which are defined by a loop width, a loop length and a loop shape; and bars that envelop the loops and that are defined by a bar width and a bar thickness, wherein plural of the loops are arranged in columns behind one another and in rows adjacent to each other; wherein first columns of first loops differ from second columns of second loops in a loop width or in a loop length so that the sheet of the expanded metal is provided with openings with different loop shapes.

The object is also achieved by a device for producing the expanded metal described supra, the device including a feed which feeds a piece of sheet metal in feed steps to an expansion blade, wherein the expansion blade has an alternating movement component that is horizontal and transversal to a feed direction of the piece of sheet metal, and wherein the expansion blade is provided with a plurality of teeth which penetrate into the piece of sheet metal with a vertical movement component to produce the loops, and wherein the expansion blade has teeth with different shapes or orientations relative to adjacent teeth.

The expanded metal according to the invention is characterized by an optical configuration that differs significantly from the prior art in that it includes different loop shapes in different loop columns. This way new optical appearances can be provided for interior covering elements made from expanded metal which were provided so far by metal covers which were fabricated by chip generating methods, e.g. a punching or a milling process. Using the expanded metal according to the invention is in particular less expensive than metal covers that are fabricated by chip generating methods. The expanded metal can also replace imitated expanded metals that are made from synthetic material and which were used so far to achieve particular optical effects.

The invention has contended against the prejudice in the art that non-uniform tooth configurations of the expansion blade and resulting non-uniform loops cause a non-uniform expansion of the metal to be processed and thus an uncontrollable deformation of the expanded metal sheet. After overcoming this prejudice, it has become clear that tooth geometries that differ from each other in a defined manner like teeth that have different wear conditions in the prior art lead to an undesirable deformation of the expanded metal sheet. However, it has become apparent that this deformation which is generated due to a defined deviation of tooth geometries is predictable and thus controllable during fabrication and when in doubt can be compensated by simple finishing.

Additionally the invention has a second essential advantage. Different loop shapes do not only lead to a new optical appearance of the expanded metal, but they also have a technical effect that can be put to use in a controlled manner. An air flow that passes through the expanded metal according to the invention can be influenced by the type of loop shape, Thus, it is possible to use the expanded metal according to the invention in an interior of vehicles as a cover for air outlets and thus to direct air flowing out of the air outlet through loop shapes of the cover that are configured differently according to the invention in order to generate, e.g., a diffuse air flow or to deflect the air flow into a fan to obtain, e.g., an optimized defrosting effect.

It is also conceivable to use the expanded metal according to the invention for speaker covers in order to influence sound direction and sound propagation in addition to an optical effect.

Thus, the expanded metal according to the invention generates new filed of application through new optical design options and technical effects.

It is intended that the sheet is subdivided into column sections wherein each column section includes loop columns with identical loop shapes, in particular when the loop shape of loops of a first column section is a mirror image of loops of a second column section.

The expanded metal according to the invention can be used as a defroster cover with an integrated air distribution arrangement in particular when at least three column sections are provided, a center column section that includes loops with a first loop shape and the loops of the columns that are respectively laterally arranged with respect to the center section are configured as a mirror images of each other.

However, it is also conceivable that each loop column has a loop shape that differs from adjacent columns, in particular when the loop shapes of the respective loop columns change from a first outer column with a loop shape that is at the most distorted in one direction through a center column with a symmetrical loop shape to a second outer column with a loop shape that has a maximum distortion in the opposite direction.

This configuration is particularly suitable for a very fine fanning of an airflow that passes through the expanded metal and thus to provide a very diffuse draft-free air flow.

The object of the invention is also achieved by a cover for internal furnishings for cars, in particular to cover ventilation and blower openings like the defroster or ventilation inlets that are fabricated from a sheet of expanded metal.

Thus, the invention uses in particular the multitude of options of the expanded metal according to the invention for directing air flows since the loop shape of individual loop columns or the loop shape of the loops of column-shaped sections determines a flow direction of air that flows through the cover.

The object of the invention is also achieved by a device for producing expanded metal which feeds a piece of sheet metal in feed steps into an expansion blade wherein the expansion blade has a horizontal movement component which is transversal and alternating to a feed direction of the sheet metal and the expansion blade is provided with a plurality of teeth which penetrate the sheet metal to produce loops through a vertical movement component, characterized in that the expansion blade has teeth with different shape and/or orientation compared to adjacent teeth.

A device of this type facilitates in particular to produce the advantageous expanded metal according to the invention.

Depending on the intended configuration of the expanded metal to be produced it is advantageous when teeth with identical shape and/or orientation are arranged in groups wherein it is provided in particular that the teeth of a first group are arranged and shaped as a mirror image of the teeth of a second group.

Furthermore, it can also be provided that the orientation of the teeth of the expansion blade changes continuously starting from a first edge tooth over a center tooth to a second edge tooth that is arranged remote from the first edge tooth wherein teeth that are arranged at an identical distance from the center tooth are arranged as mirror images relative to each other.

It is also provided that a tooth shape of the teeth of the expansion blade changes continuously starting from a first edge tooth over a center tooth to a second edge tooth that is remote from the first edge tooth wherein teeth that are arranged equidistant from the center tooth are arranged as a mirror image of each other.

BRIEF DESCRIPTION OF THE DRAWINGS

Further advantages and an even better comprehension of the invention can be derived from a description of various embodiments with reference to drawing figures; wherein.

DETAILED DESCRIPTION OF THE INVENTION

Figure 1:
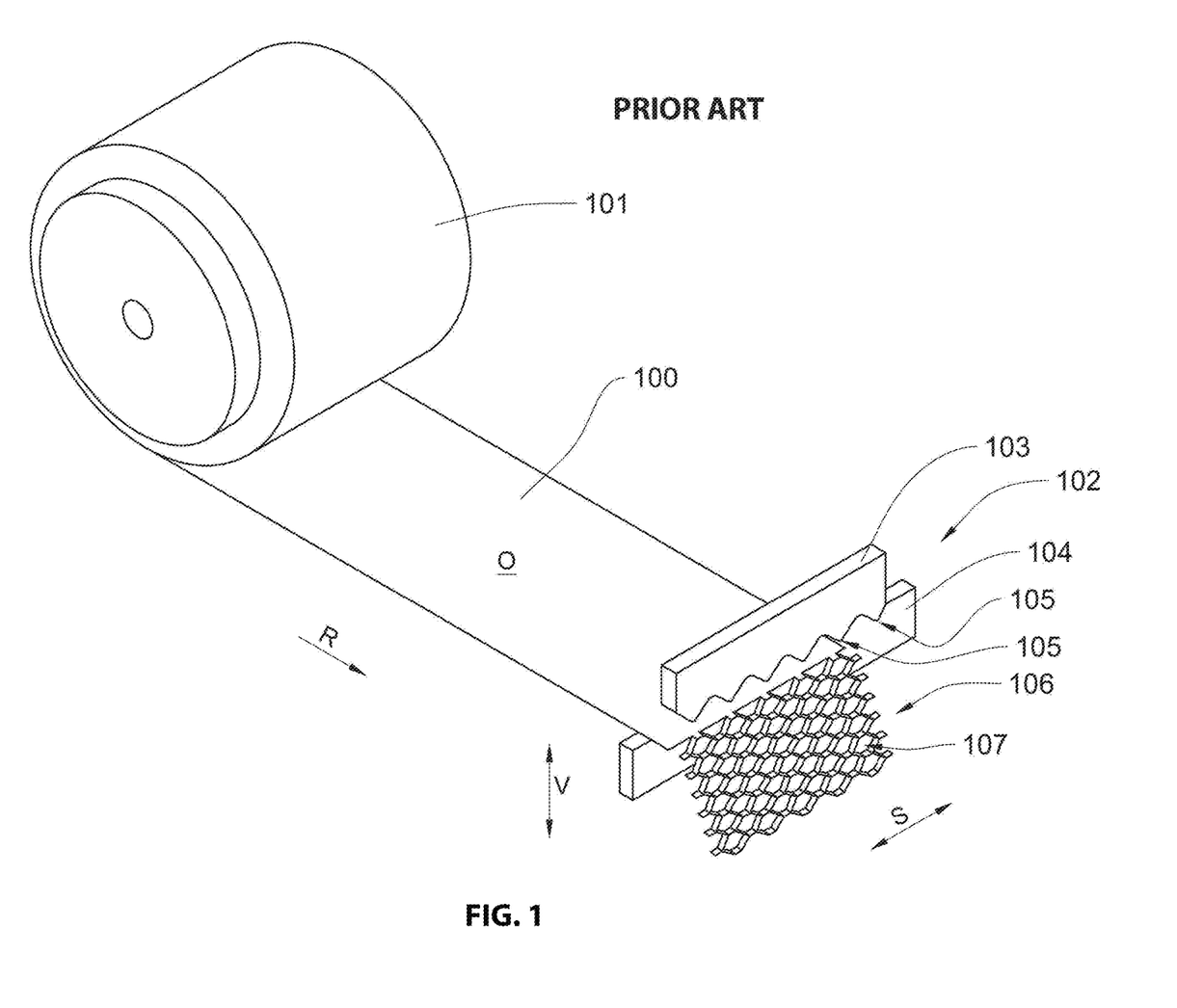
FIG. 1 illustrates a schematic view of prior art expanded metal fabrication.
Figure 2:
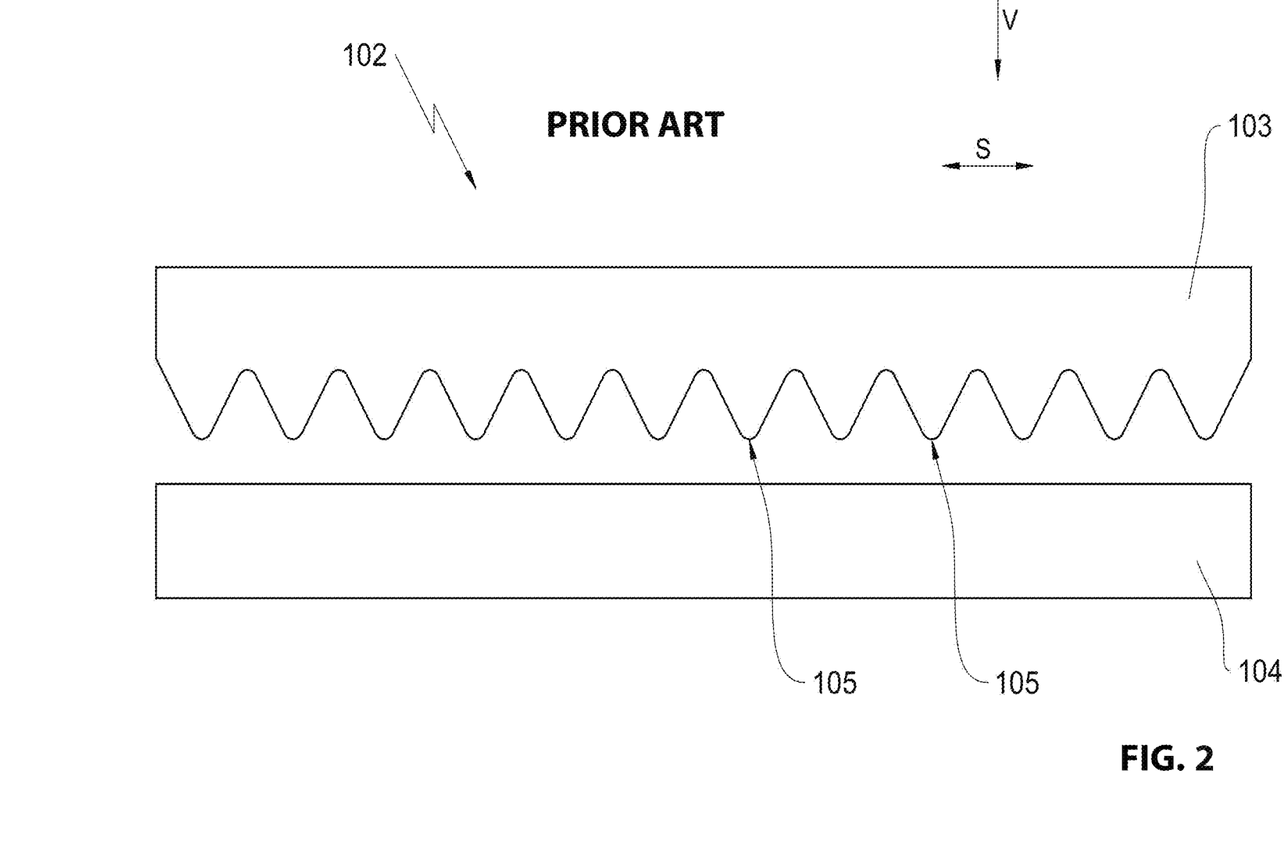
FIG. 2 illustrates a prior art expansion blade for producing the expanded metal according to FIG. 1.

FIGS. 1 and 2 illustrate prior art solutions. A piece of sheet metal 100 that is rolled into a coil 101 is fed to an expansion arrangement 102 which is only schematically illustrated. This expansion arrangement 102 includes an expansion blade 103 and a reaction bearing 104 for the sheet metal 100. The expansion blade 103 moves in a vertical direction V up and down relative to the sheet metal surface O and back and forth in a lateral direction S in an alternating manner. Thus, the teeth 105 of the expansion blade 103 penetrate into the sheet metal 100 and displace sheet metal material causing a certain amount of deformation, in particular transversal to the lateral direction S, in the so-called expansion direction R. To a certain amount the sheet metal 100 is also expanded in a transversal direction S. Thus, the sheet metal 100 exits the expansion arrangement 102 as an expanded metal 106.

The illustrated expanding arrangement 102 is also schematically illustrated in FIG. 2, but with more detail. Particular emphasis is placed on the prior art expansion blade 103. This expansion blade includes a series of expansion teeth 105 that are arranged adjacent to each other. These expansion teeth have identical tooth geometries and identical tooth orientations. This is quite important for prior art expanded metal fabrication in order to assure uniform expansion of the metal by introducing identical loops 107. Only this way it is assured that a high quality expanded metal with minimum distortion exits the expansion arrangement and requires no finishing or only a minimum amount of finishing.

Figure 7:
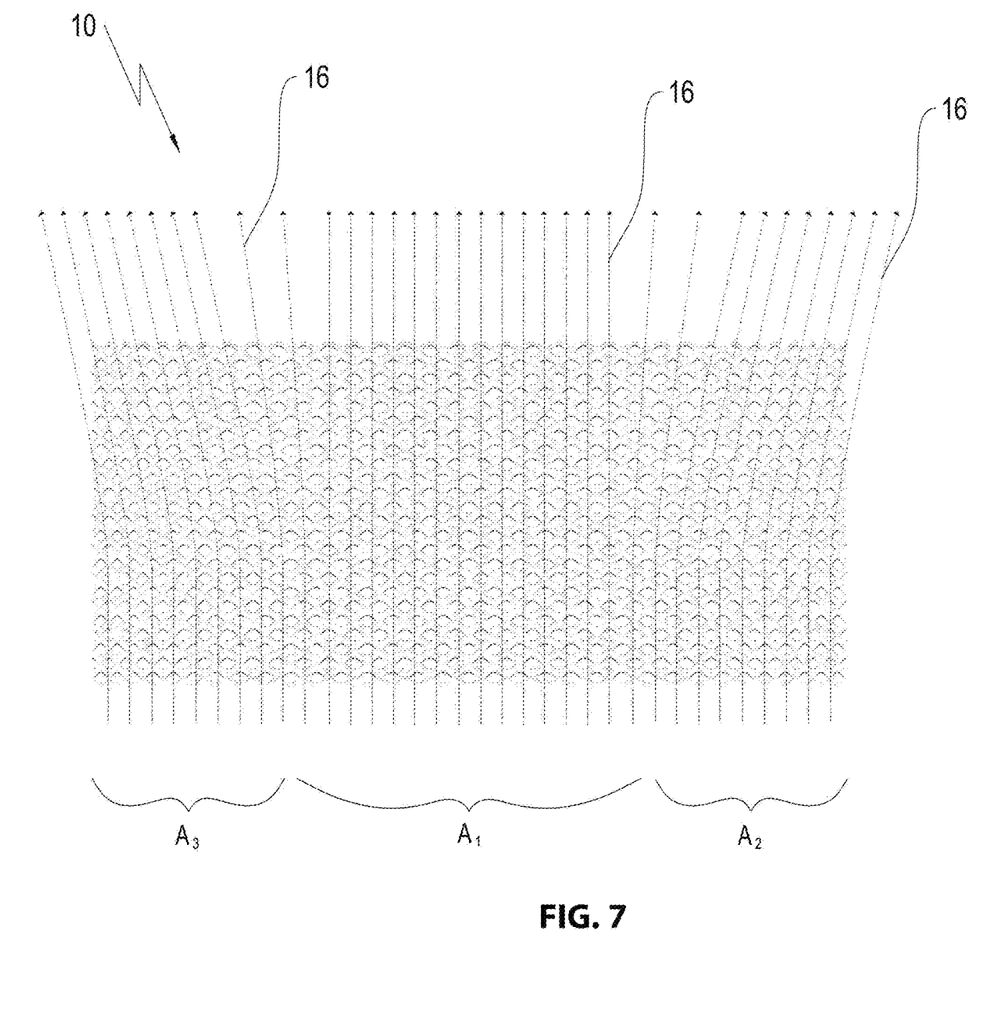
FIG. 7 illustrates the expanded metal according to the invention according to FIG. 5 with air flows shown.
Figure 8:
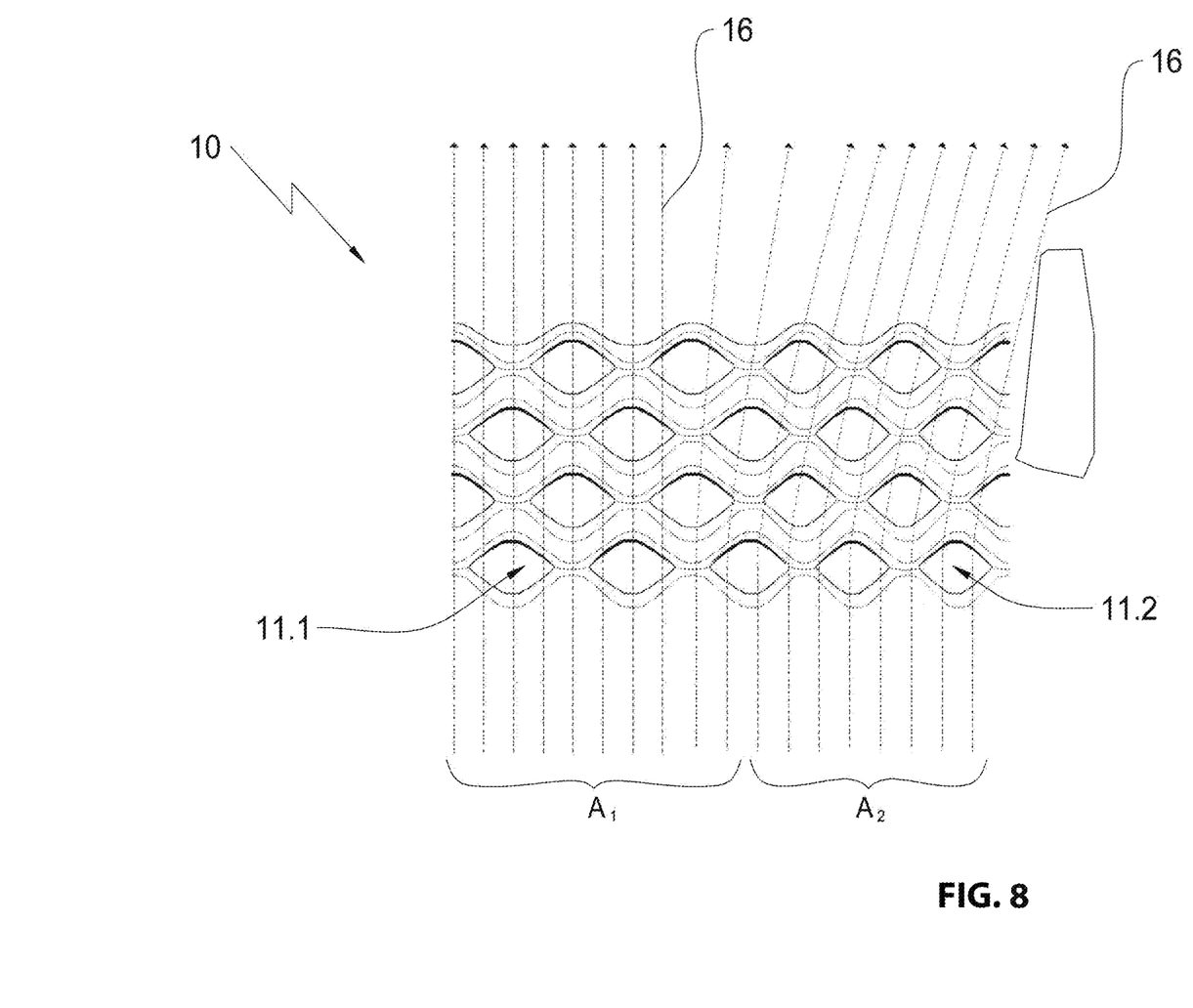
FIG. 8 illustrates the blown-up detail according to FIG. 6 with air flows illustrated.
Figure 9:
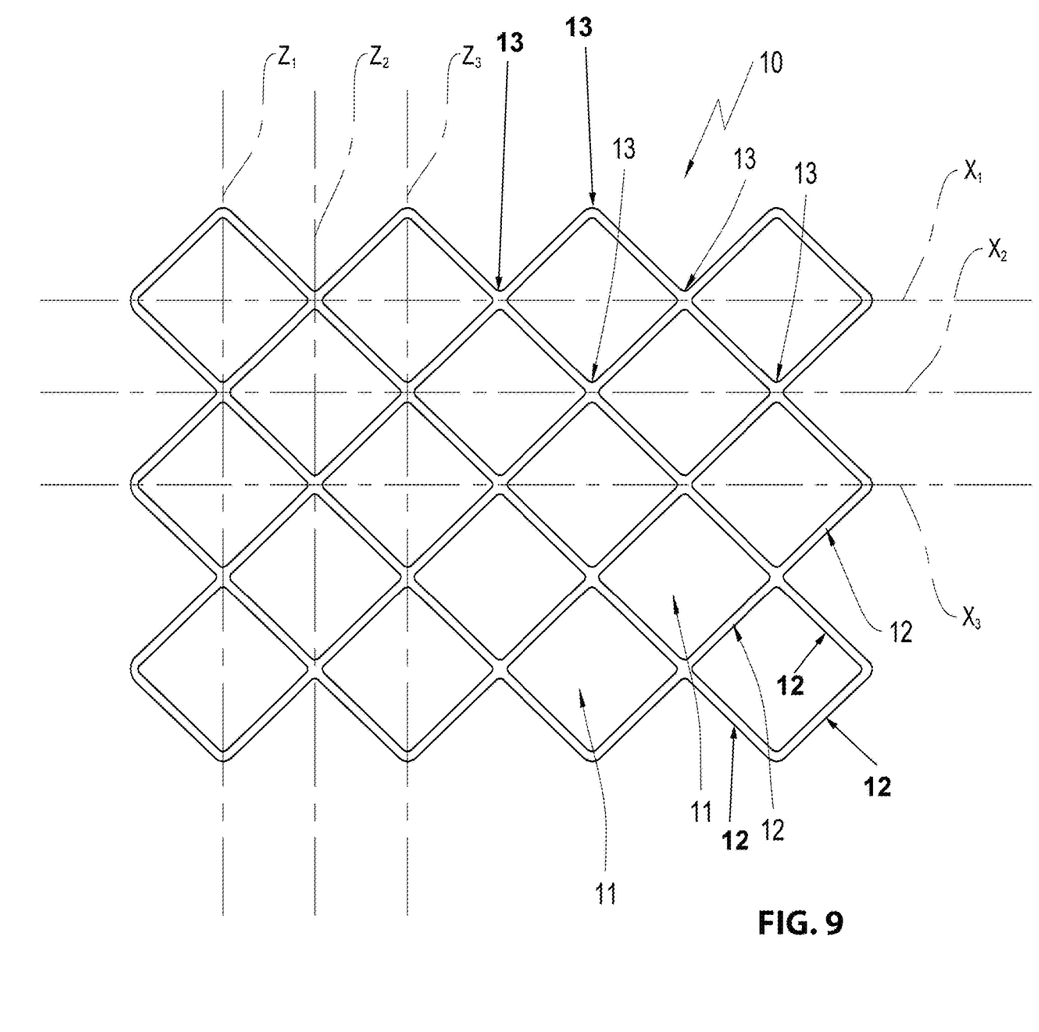
FIGS. 9 and 10 illustrate a schematic view of an additional expanded metal according to the invention.
Figure 10:
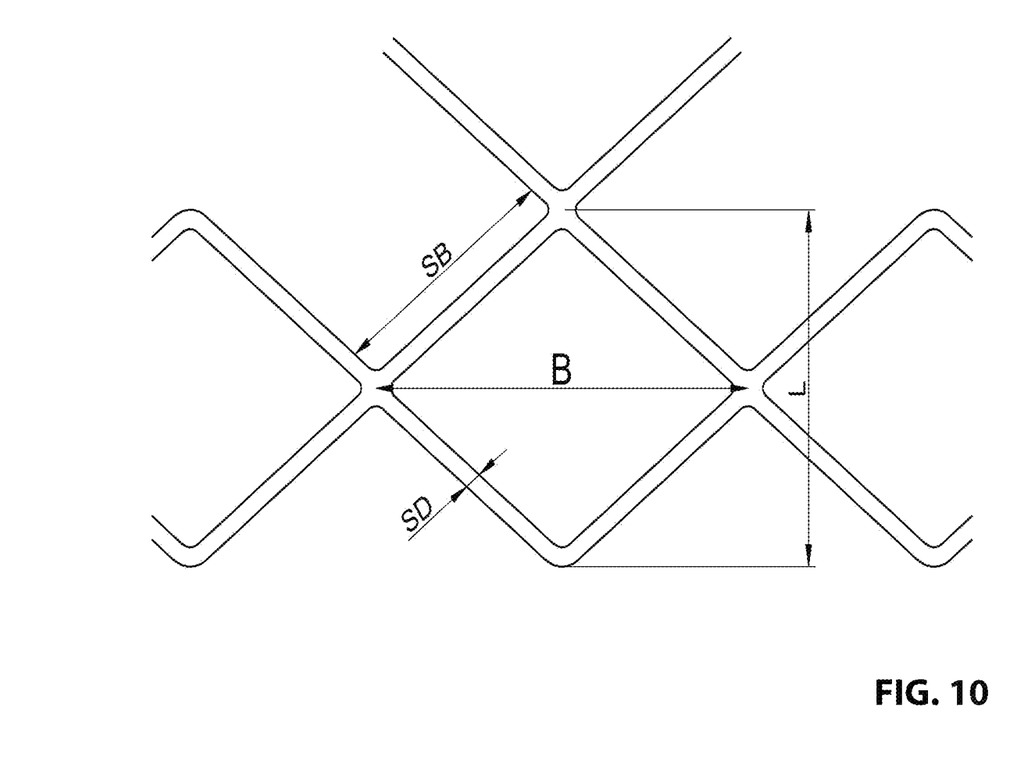

In FIGS. 3 through 10 a piece of expanded metal according to the invention is designated overall with reference numeral 10, This piece of expanded metal 10 is illustrated in a detail view and schematically in FIGS. 9 and 10. The expanded metal 10 is made from a plurality of loops 11 which are enveloped by four linear bars 12. The bars 12 are made from the base material, typically metal. Where the four loop enveloping bars 12 intersect, a node 13 is formed so that each loop 11 has four nodes 13. The expanded metal 10 is formed by a plurality of loops 11 which are arranged in rows $X_1$ through $X_N$ adjacent to each other and in loop columns $Z_1$ through $Z_N$ behind one another. The loop shape is defined by a loop length L and a loop width B wherein a measurement is performed respectively from node center to node center. Additional parameters are the bar width Sb and the bar thickness Sd of the bars 12 that envelop the loops 11.

Figure 5:
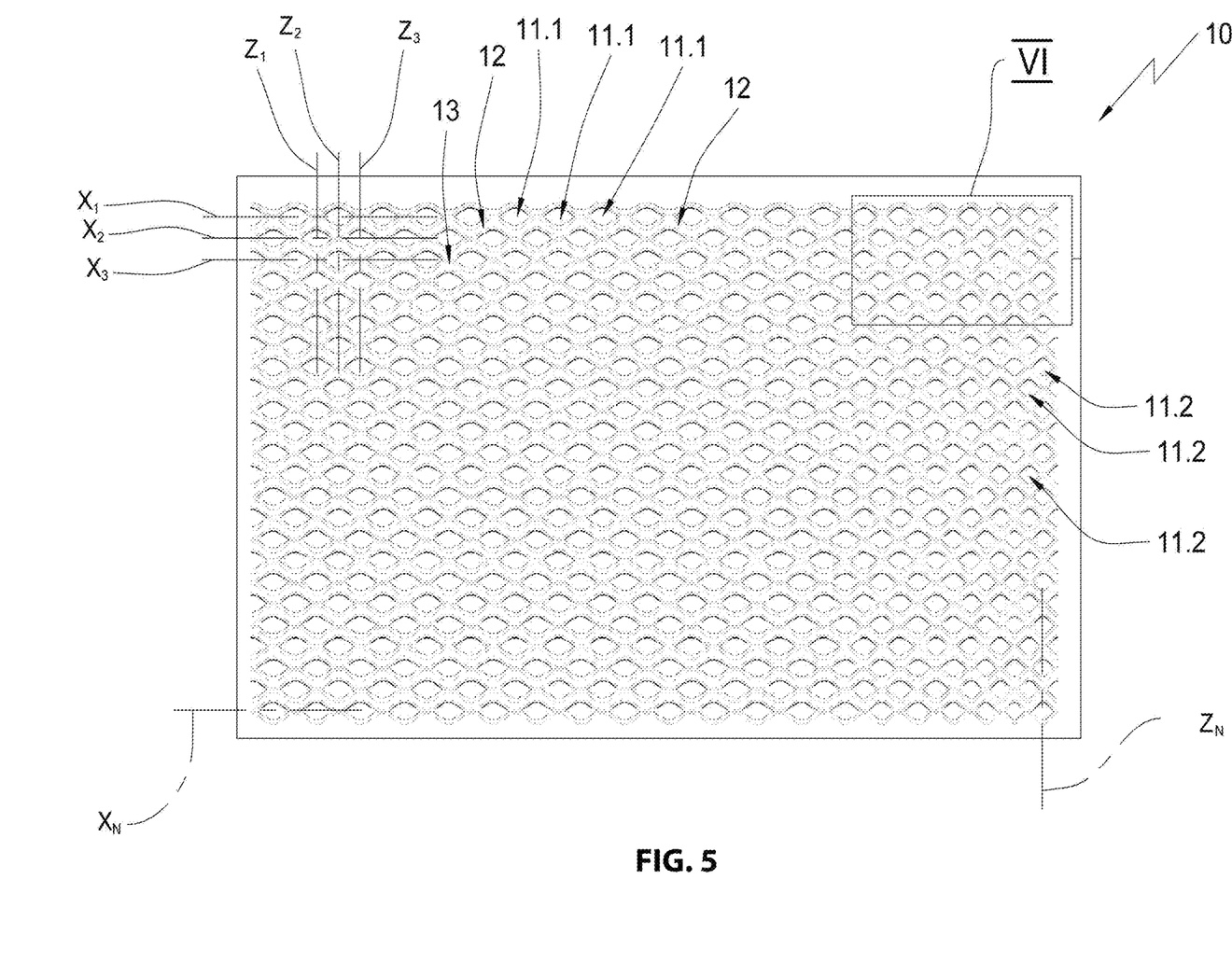
FIG. 5 illustrates a sheet of expanded metal according to the invention.

The expanded metal 10 according to the invention is illustrated in overview in FIG. 5. The expanded metal includes a plurality of rows $X_1$ through $X_N$ adjacent to each other and columns $Z_1$ through $Z_N$ of loops 11 that are arranged behind one another and which are separated from each other by bars 12. Also here the bars 12 intersect in nodes 13. It is already evident from the overview illustration in FIG. 5 that the loops 11 are not formed identically continuously. The expanded metal 10 illustrated in FIG. 5 is initially formed by a plurality of loops 11.1 with a first shape which have an expanded diamond shape. In an edge portion that is on a right side with respect to the drawing plane, however, loops 11.2 with a second shape are formed in the expanded metal 10. Also, these loops have an approximately diamond-shaped geometry, which, however, is distorted compared to the loops 11.1 with the first shape.

Figure 6:
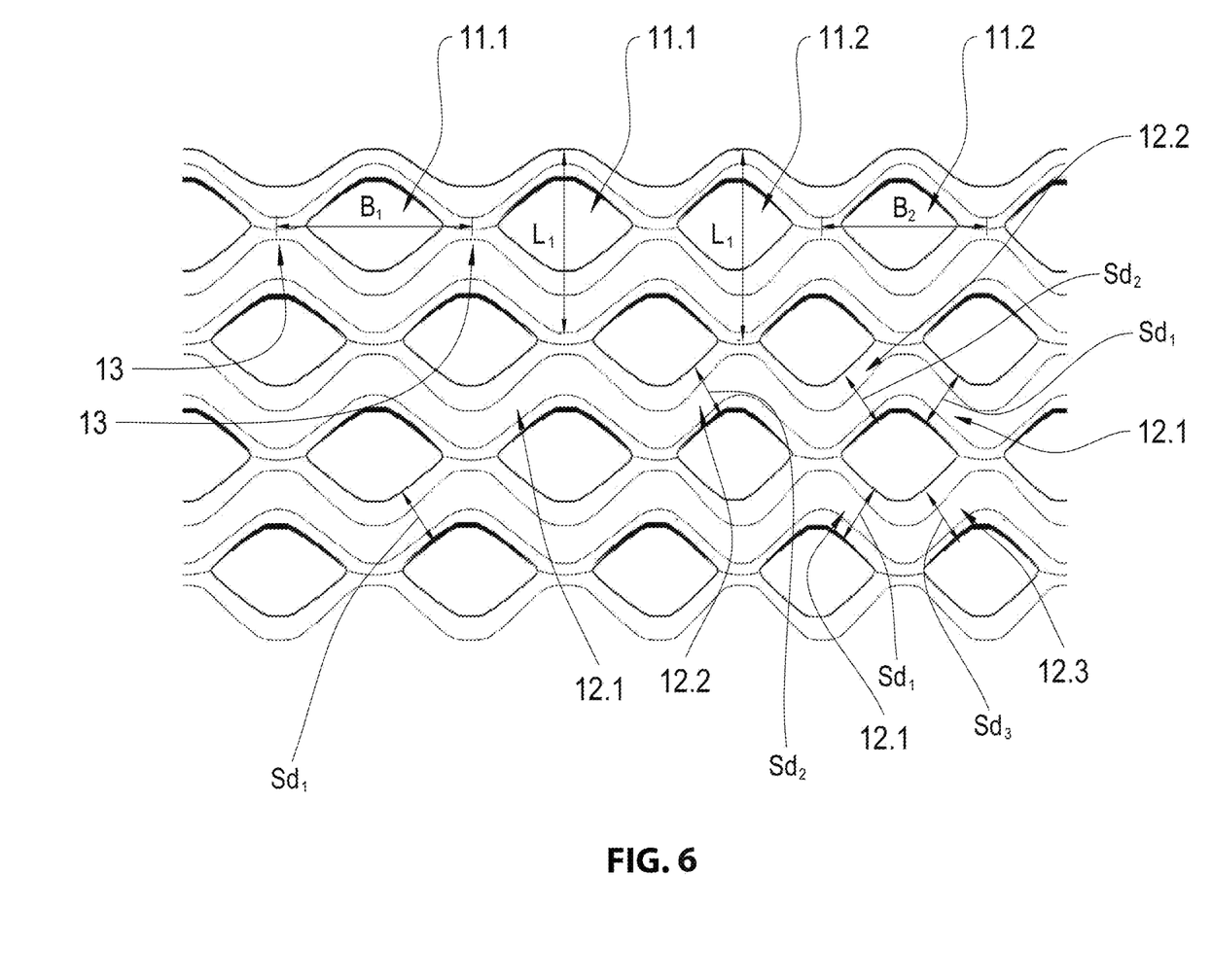
FIG. 6 illustrates a blown-up detail rectangle VI of FIG. 5.

This is also clearly evident from FIG. 6, which shows an enlargement of the detail VI in FIG. 5. The loops 11.1 with the first shape have a width $B_1$ measured from node center to node center, and the loops with the second shape 11.2 have a loop width $B_2$, Thus, the loop width $B_2$ is smaller than the loop width $B_1$. The length of the loops with the first shape 11.1 designated as $L_1$ is identical to a length $L_1$ of the loops with the second shape 11.2.

The different loop width B is a consequence of a different tooth geometry of a tooth 15 of an expansion blade 14 according to the invention. The tooth 15 to produce a column in the second shape 11.2 has less width than the tooth 15 used to fabricate a loop with the first shape 11.1.

An essential advantage of maintaining an identical length $L_1$ of loops in a first shape 11.1 and in a second shape 11.2 can be found in that a length expansion when producing the expanded metal 10 between loops 11 that are arranged adjacent to each other in rows $X_1$ to $X_N$ is identical though the geometries are different and thus a disadvantageous distortion of the expanded metal 10 can be kept within very tight limits.

FIG. 6, however, illustrates an additional feature of the expanded metal 10 according to the invention which relates to a shape of bars 12 that define the loops 11. Loops with the first shape 11.1 are uniformly framed by bars 12.1. The bars 12.1 are configured to have a bar thickness $Sd_1$. The enlarged detail of the expanded metal 10 in FIG. 6 therefore conveys the impression that loops with the first shape 11.1 are approximately centrally arranged between four adjacent nodes 13.

The bars with the second shape 11.2, however, are enveloped by diametrically opposed bars 12.2 and 12.3 and diametrically opposed bars 12.1. The bars 12.2 are configured to have a bar thickness $Sd_2$, the bars 12.3 are configured to have a bar thickness $Sd_3$. The bars 12.1 have the bar thickness $Sd_1$ also this case.

Therefore, the loops 11.2 with the second shape appear to be offset substantially to the right and slightly upward with respect to the paper plane and relative to four adjacent nodes which envelop the loop 11.2. This offset is caused by a different tooth arrangement.

With respect to the expanded metal 10 according to the invention it is appreciated that loop shapes that differ from each other cause different bar dimensions as a matter of consequence but primarily deviating bar widths Sb are to be expected. Therefore, a deviation of the bar thicknesses Sd is not mandatory in order to produce different loop shapes in the expanded metal but this an additional optional feature of the expanded metal 10 according to the invention.

As evident in particular from FIG. 8 the different bar thicknesses Sd, caused, e.g., by a different tooth orientation, have a particular technical effect. FIG. 8 initially illustrates a cut-out from the expanded metal according to FIG. 5 that is similar to FIG. 6. The loops 11.1 with the first shape form a first section $A_1$, the loops 11.2 with the second shape form a second section $A_2$. Through the different loop geometries and different bar geometries the air flow symbolized by the arrow 16 can be influenced when ventilation air is blown through the expanded metal 10 according to the invention. As indicated by the arrows 16 different loop and/or bar geometries lead to a deflection of the air flow 16. When the air flow 16 is oriented vertically with respect to the drawing plane in section $A_1$ then the air is deflected from the vertical to the right in section $A_2$ that is formed by the loops with the second shape 11.2. This way a fine fanned diffuse air flow is achieved as a function of the absolute loop size of the loops 11.1 and 11.2.

This effect can be used e.g. for an expanded metal 10 according to the invention according to FIG. 7. Thus, the expanded metal 10 is in turn divided again into sections $A_1$ and $A_2$. Additionally, the expanded metal includes a section $A_3$. Each section $A_1$-$A_3$ includes loops 11 with identical shapes which are arranged in rows adjacent to each other and in columns behind one another. The loop shapes between the individual sections $A_1$-$A_3$, however, differ from each other. Thus, it is appreciated that a loop shape of the loops 11 of section $A_2$ can be found as a mirror image in section $A_3$. This way section $A_1$ generates an essentially vertically oriented air flow with respect to the paper plane. In the sections $A_2$ and $A_3$ however the air flow 16 is deflected to the right or to the left. This way it is possible to arrange the expanded metal 10 illustrated in FIG. 7 e.g. as a cover fora defrosting arrangement in a portion of a windshield of a vehicle. Covers in a portion of the windshield made from expanded metal, however, are known in principle. The different loop shapes, however, provide an option to adjust the optical appearance.

However, the effect described supra of the expanded metal 10 according to the invention upon the air flow 16 is essential, Contrary to the prior art the expanded metal 10 according to the invention facilitates distributing the air flow 16 that exits from the feed air opening of the defroster and can be oriented over the windshield width which requires separate air guidance and diffusion devices in the prior art below the cover that is used in the prior art.

Certainly, other applications are conceivable for a piece of expanded metal 10 that is configured according to the invention. Also, other air outlets can be provided with a cover of this type in order to orient the exiting air flow 16. It is also conceivable to use expanded metals of this type as speaker covers to influence a sound exit.

The invention also relates to a novel expansion blade which is overall designated with reference numeral 14. The expansion blade 14 according to the invention is illustrated in different embodiments in FIGS. 3 and 4. The expansion blade 14 according to the invention also cooperates with a reaction bearing 17 to fabricate the expanded metal 10. Furthermore, the expansion blade includes a plurality of teeth 15.

Figure 3:
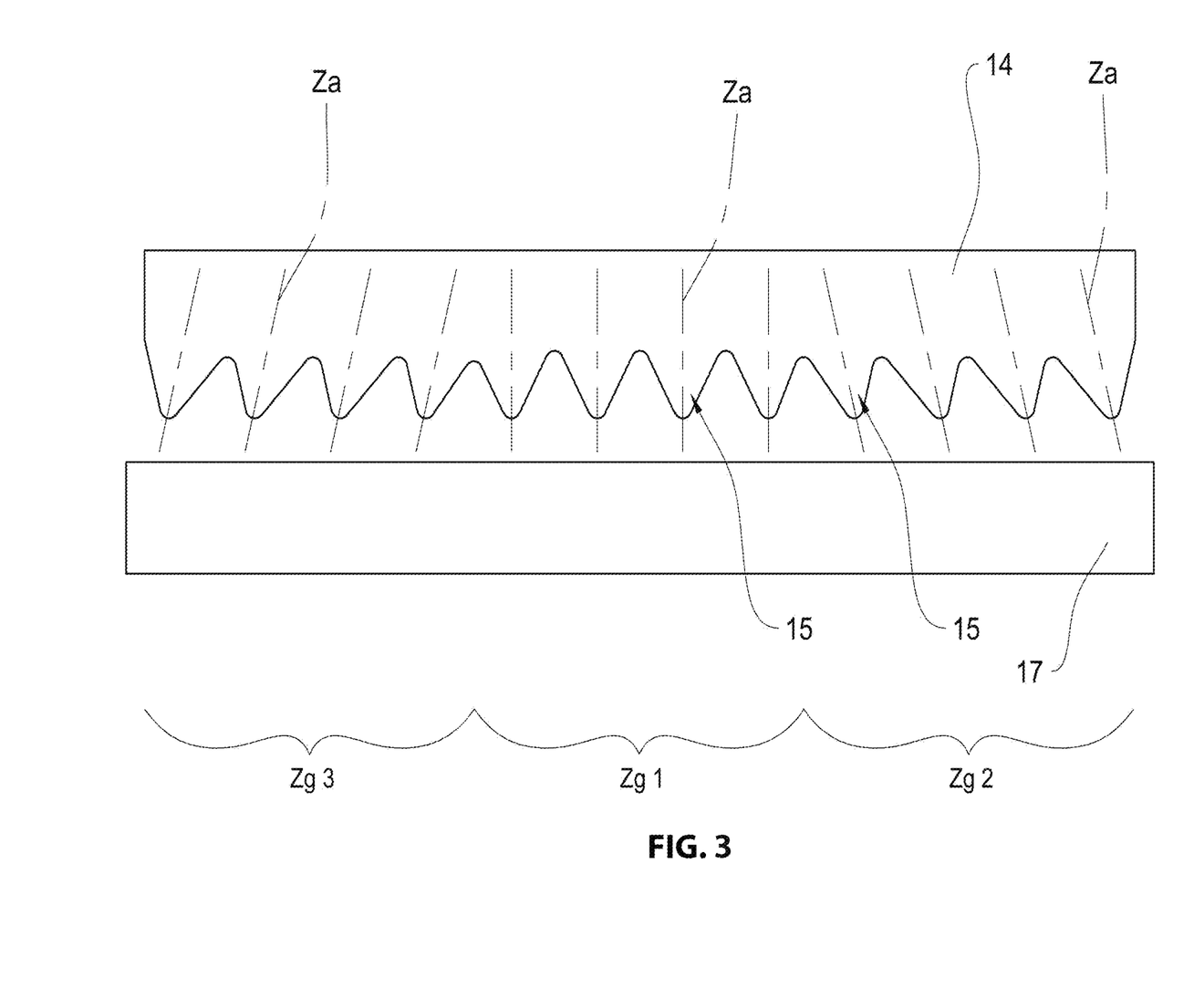
FIG. 3 illustrates a first expansion blade according to the invention for producing expanded metal according to the invention.

In FIG. 3 identical and/or similar teeth 15 are arranged in tooth groups $Zg_1$ through $Zg_3$. The teeth 15 have so called tooth axes Za which can be for example the axes of symmetry for rotation symmetrical teeth 15. FIG. 3 illustrates that the tooth axes Za of teeth 15 within the tooth groups $Zg_1$-$Zg_3$ are oriented parallel to each other, however, an orientation of the tooth axes Za between the tooth groups $Zg_1$-$Zg_3$ differs. Thus, the tooth axes Za of the group $Zg_2$ are configured as a mirror images of the tooth axes Za of the group $Zg_3$. The tooth groups $Zg_3$ and $Zg_2$ form edge tooth groups wherein the tooth group $Zg_1$ is arranged between the tooth groups $Zg_2$ and $Zg_3$.

Thus, the expansion blade 14 according to FIG. 3 would fabricate an expanded metal 10 in which loops with different shapes are arranged in rows adjacent to each other and in columns behind one another in sections $A_1$, $A_2$ and $A_3$. However, the expansion blade 14 in FIG. 3 does not necessarily represent the expansion blade 14 which has to be used for producing the expanded metal 10 that is illustrated in FIGS. 5-10.

Figure 4:
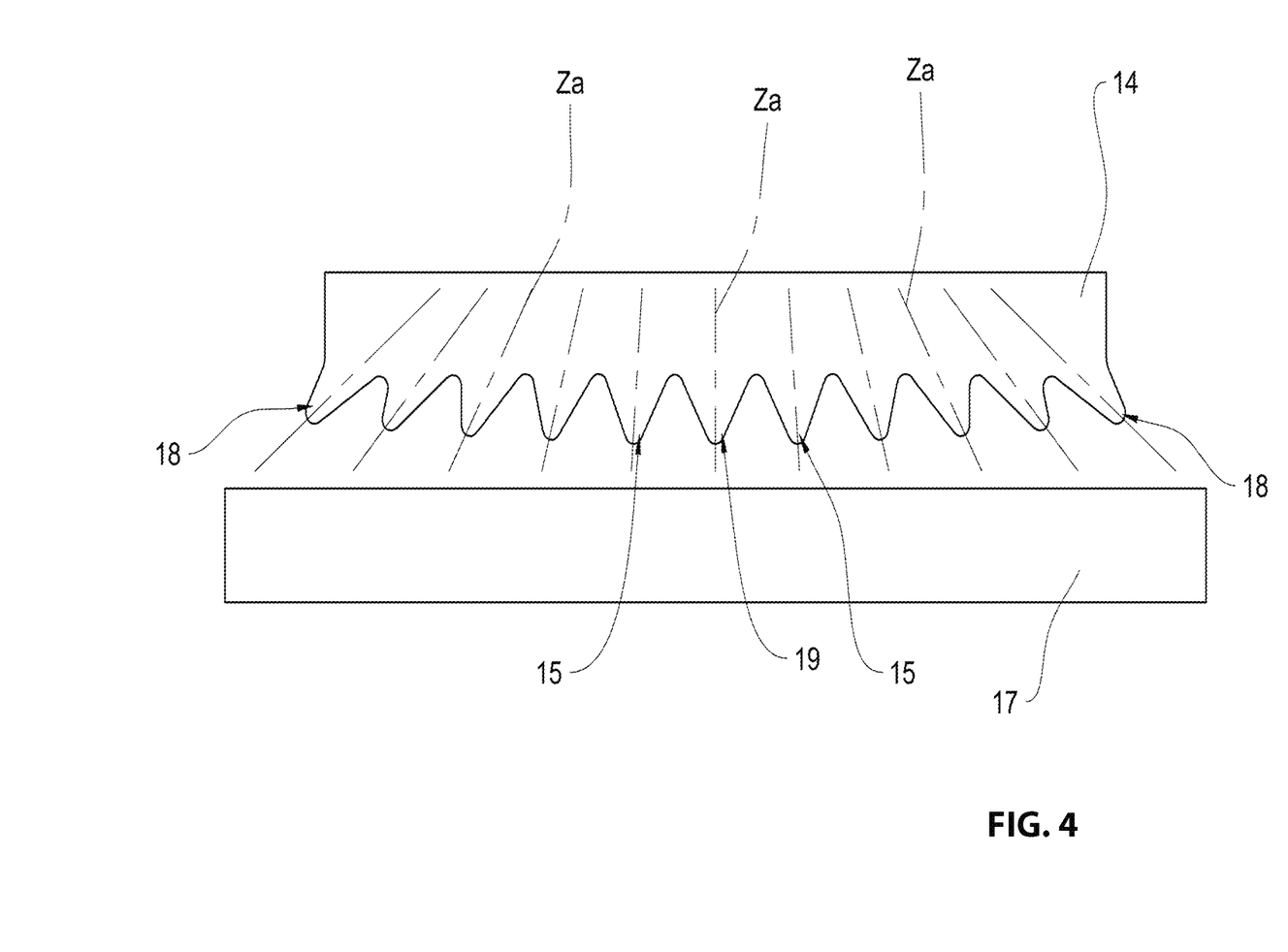
FIG. 4 illustrates a second expansion blade according to the invention for producing expanded metal according to the invention.

FIG. 4 illustrates another expansion blade 14 according to the invention, however in an alternative embodiment. Also, here, tooth axes Za of the individual teeth 15 are illustrated. In the expansion blade according to the invention according to FIG. 4 each tooth 15 has an individual orientation. The outer teeth 15, however, are also the edge teeth 18 and the tooth 15 in the center forms the so called center tooth 19. Starting with center tooth 19 and moving towards the edge of the expansion blade an orientation of the tooth axis Za of the respective tooth 15 changes continuously towards the respective edge tooth 18 and thus also the orientation of the respective tooth 15 changes continuously, Thus, the orientation of teeth 15 that have an identical distance from the center tooth 19 is mirror imaged. When piece of expanded metal 10 is produced by an expansion blade 14 according to FIG. 4 a shape of individual loops 11 within in each loop column Z is identical, the loops 11 of different loop columns Z differ from each other in shape.

Starting from a center loop column Z with a basic loop shape, however, the basic loop shape of any loop column Z oriented towards an edge of the expanded metal is distorted in one direction, wherein loop columns Z that are spaced apart equidistant from a center loop column have loop shapes that are configured as mirror images.

Depending on loop shape and orientation an air flow 16 can be fanned out in a particularly fine manner or also bundled using the expanded metal 10.

With respect to the expansion blade 14 according to FIG. 4 it is appreciated that the tooth geometry and orientation is not necessarily configured to produce the expanded metal 10 according to FIGS. 5-10. Also, here, the schematic illustration merely shows engineering design options for an expansion blade 14 according to the invention.

REFERENCE NUMERALS AND DESIGNATIONS

100 sheet metal
101 coil
102 expansion arrangement
103 expansion blade
104 reaction bearing
105 teeth of expansion blade 103
106 expanded metal
107 loop
108 bar
10 expanded metal
11 loop
11.1 loop with first shape
11.2 loop with second shape
12 bar
13 node
14 expansion blade
15 tooth
16 air flow
17 reaction bearing
18 edge teeth
19 center tooth
A section
V vertical direction
O surface of expansion blade 103
S sideways direction
R expansion direction
X loop row
Z loop column
L loop length
B loop width
Sb bar width
Sd bar thickness
Zg tooth group
Za tooth axis

What is claimed is:

1. A method for producing an expanded metal, the method comprising . . . by increasing amounts from diamond shaped loop to diamond shaped loop as a function of positions of the diamond shaped loops relative to a center of the width of the sheet . . . wherein the single expansion blade has teeth that vary in shape and orientation.

2. The method according to claim 1, further comprising: configuring the sheet with column sections wherein each of the column sections has loop columns with an identical loop shape.

3. The method according to claim 2, further comprising: configuring a loop shape of loops of a first column section as a mirror image of a loop shape of loops of a second column section.

4. The method according to claim 3, further comprising: providing at least three column sections,
wherein a center section includes loops with a first loop shape, and
wherein loops of columns that are respectively laterally arranged relative to the center section are configured as mirror images of each other.

5. The method according to claim 1, further comprising: configuring each lip column has a loop shape that differs from loop shapes of adjacent columns.

6. The method according to claim 5, further comprising: varying loop shapes of respective loop columns from a first outer column with a loop shape that is distorted from a symmetrical loop shape by a larger amount in one direction to a center column with the symmetrical loop shape to a second outer column with a loop shape that is distorted from the symmetrical loop shape by a larger amount in an opposite direction.

7. A method according to claim 1, further comprising: feeding a piece of sheet metal in feed steps to the single expansion blade, wherein the single expansion blade has an alternating movement component that is horizontal and transversal to the feed direction of the sheet metal.

8. The method according to claim 7, further comprising: arranging teeth with identical shape or orientation in groups.

9. The method according to claim 8, further comprising: arranging or shaping the teeth of a first group as mirror images of teeth of a second group.

10. The method according to claim 7,
wherein an orientation of the teeth of the expansion blade changes continuously starting from a first edge tooth over a center tooth to a second edge tooth that is not adjacent to the first edge tooth,
wherein teeth that are arranged equidistant from the center tooth are oriented as mirror images of each other.

11. The method according to claim 7,
wherein a shape of the teeth of the expansion blade changes continuously starting from a first edge tooth over a center tooth to a second edge tooth that is not adjacent to the first edge tooth, and
wherein teeth that are arranged equidistant from the center tooth are configured as mirror images of each other.

12. The method according to claim 1, further comprising: enveloping the loops by bars that are configured to have a different bar width.

13. The method according to claim 1, further comprising: enveloping the loops by bars that are configured to have a different bar thickness.

14. The method according to claim 7, wherein center axes of teeth that are on opposite sides of a center axis of the center tooth are inclined at opposite angles with identical absolute values relative to the center axis of the center tooth.

* * * * *